US012750728B2

(12) United States Patent
Nanda

(10) Patent No.: US 12,750,728 B2
(45) Date of Patent: Sep. 29, 2026

(54) DYNAMIC TRAFFIC CONTROL

(71) Applicant: Parallel Wireless, Inc., Nashua, NH (US)

(72) Inventor: Nihar Nanda, Acton, MA (US)

(73) Assignee: Parallel Wireless, Inc., Nashua, NH (US)

( * ) Notice: Subject to any disclaimer, the term of this patent is extended or adjusted under 35 U.S.C. 154(b) by 272 days.

(21) Appl. No.: 18/329,575

(22) Filed: Jun. 5, 2023

(65) Prior Publication Data

US 2024/0031863 A1 Jan. 25, 2024

Related U.S. Application Data

(60) Provisional application No. 63/348,510, filed on Jun. 3, 2022.

(51) Int. Cl.
*H04W 28/02* (2009.01)

(52) U.S. Cl.
CPC ... *H04W 28/0289* (2013.01); *H04W 28/0231* (2013.01)

(58) Field of Classification Search
CPC ......... H04W 28/0289; H04W 28/0231; H04W 24/04; H04W 24/02; H04L 47/83; H04L 43/062; H04L 41/147; H04L 41/0816; G06N 20/00
See application file for complete search history.

(56) References Cited

U.S. PATENT DOCUMENTS

| | | | |
|---|---|---|---|
| 2015/0289149 A1 | 10/2015 | Ouyang et al. | |
| 2019/0342183 A1* | 11/2019 | Nunna | H04L 41/16 |
| 2021/0014698 A1 | 1/2021 | Meier-Hellstern et al. | |

(Continued)

FOREIGN PATENT DOCUMENTS

| | | | |
|---|---|---|---|
| WO | 2021254354 A1 | 6/2021 | |

*Primary Examiner* — Kibrom T Hailu
(74) *Attorney, Agent, or Firm* — Michael Y. Saji

(57) ABSTRACT

Dynamic Traffic Control (DTC) aims at balancing network capacity demand and supply at a finer grain to minimize capacity buffer always comfortably meeting the demand trends. Resiliency of DTC enables handling traffic management of network regions that have gone thru equipment replacement, or upgrades, or service expansions. DTC should be a fully automated close-loop control process in managing regional traffic without human intervention but reporting benefits measuring improvements from a baseline. In one embodiment, a method of providing dynamic traffic control includes forecasting, using a model, network traffic build up over a region ahead of time; and adjusting network capacity to match a forecasted demand from the model, allowing a precise control of capacity and demand closely matched all times. In another embodiment a system for dynamic traffic control includes a traffic predictor; a controller in communication with the traffic predictor; a Key Performance Indicator (KPI) collector in communication with the traffic predictor; a region manager in communication with the traffic predictor and the controller; a model manager in communication with the traffic predictor and the controller; an action recommender in communication with the controller; and wherein the system forecasts network buildup over a region ahead of time and recommends network capacity adjustments.

20 Claims, 9 Drawing Sheets

(56) References Cited

U.S. PATENT DOCUMENTS

| | | | | |
|---|---|---|---|---|
| 2021/0099891 | A1* | 4/2021 | Zhao | H04W 16/18 |
| 2021/0204148 | A1* | 7/2021 | Chou | H04W 24/02 |
| 2021/0235277 | A1* | 7/2021 | Parekh | H04W 16/14 |
| 2021/0258866 | A1* | 8/2021 | Chou | H04W 48/16 |
| 2021/0344582 | A1* | 11/2021 | Samadi | H04L 43/14 |
| 2022/0014471 | A1 | 1/2022 | Arora et al. | |
| 2022/0104028 | A1 | 3/2022 | Chen et al. | |
| 2024/0263959 | A1* | 8/2024 | Nakazato | G01C 21/3691 |

* cited by examiner

DYNAMIC TRAFFIC CONTROL

CROSS-REFERENCE TO RELATED APPLICATIONS

The present application claims priority under 35 U.S.C. § 119(e) to U.S. Provisional Patent Application No. 63/348,510, which is hereby incorporated by reference in its entirety for all purposes. The present application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes . This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety. The present application hereby incorporates by reference U.S. patent application Ser. No. 18/174,580 in its entirety for all purposes.

BACKGROUND

Open Radio Access Network (Open RAN) is a movement in wireless telecommunications to disaggregate hardware and software and to create open interfaces between them. Open RAN also disaggregates RAN from into components like RRH (Remote Radio Head), DU (Distributed Unit), CU (Centralized Unit), Near-RT (Real-Time) and Non-RT (Real-Time) RIC (RAN Intelligence Controller). Open RAN has published specifications for the 4G and 5G radio access technologies (RATs).

Network regions have multiple base stations and cells, some cells in edge others in the middle of the network. During rush hours cells in outer edge experience high traffic first before dispersing towards middle cells in the region. This is a characteristics of traffic patterns in city centers, suburbs, special event centers, market complexes, etc. Once people gather in the crowded areas edge cells experience lighter loads compared to cells in central. Similarly, as people begin to leave crowded areas, outer cells experience more traffic while the middle cells experience fading traffic. This cyclic traffic pattern repeats daily, however hours when high and low volumes are experienced may vary based on day of week, seasons, weather, special event schedules, growth and decline of businesses. To meet network traffic demands, operators use capacity cells which are turned on during the periods of heavy load and turned off as load subsides. Typically, capacity cells consume more power, operators try to maintain a close control on how long these cells are used for.

SUMMARY

Dynamic Traffic Control (DTC) aims at balancing network capacity demand and supply at a finer grain to minimize capacity buffer always comfortably meeting the demand trends. Resiliency of DTC enables handling traffic management of network regions that have gone thru equipment replacement, or upgrades, or service expansions. DTC should be a fully automated close-loop control process in managing regional traffic without human intervention but reporting benefits measuring improvements from a baseline.

In one embodiment, a method of providing dynamic traffic control includes forecasting, using a model, network traffic build up over a region ahead of time; and adjusting network capacity to match a forecasted demand from the model, allowing a precise control of capacity and demand closely matched all times.

In another embodiment a system for dynamic traffic control includes a traffic predictor; a controller in communication with the traffic predictor; a Key Performance Indicator (KPI) collector in communication with the traffic predictor; a region manager in communication with the traffic predictor and the controller; a model manager in communication with the traffic predictor and the controller; an action recommender in communication with the controller; and wherein the system forecasts network buildup over a region ahead of time and recommends network capacity adjustments.

DETAILED DESCRIPTION

It should be noted that while a particular Radio Access Technology (RAT) may be discussed in describing the present invention, the concepts apply to RATs including but not limited to 4G, 5G and multi-RAT.

Figure 1:
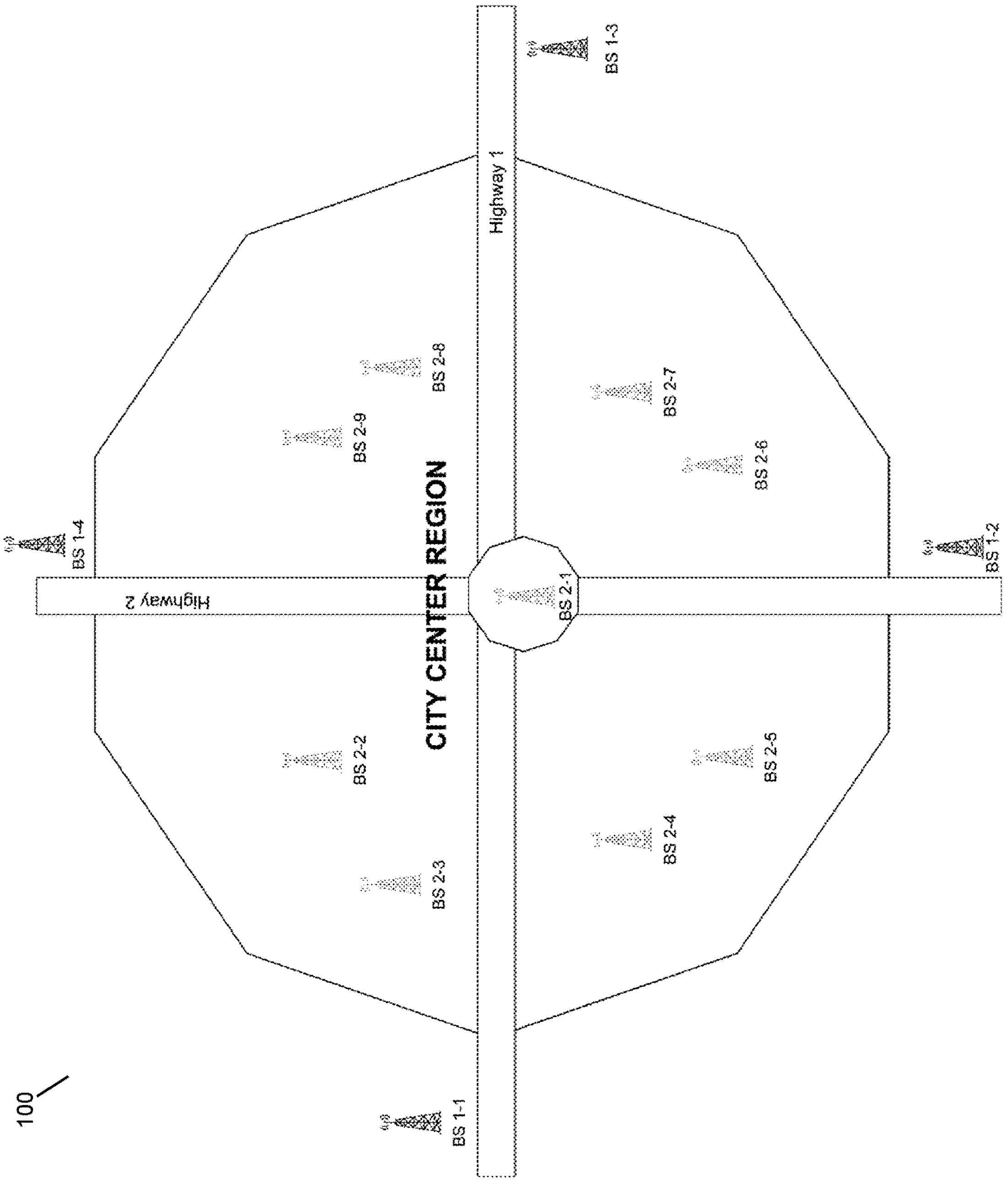
FIG. 1 is a schematic depiction of a base station deployment, in accordance with some embodiments.

FIG. 1 illustrates a simple distribution of base stations in a City Center connected to other parts of the city thru four incoming highways located in North, South, East, and West. The base stations in region are grouped in two, inner and outer. During peak hours traffic flows into the city center. The base stations in outer edge experience are first to experience traffic load as people start coming to the City Center before the inner base stations. Similarly, as people continue to leave, the inner ring base stations experience traffic reduction before the outer ring base stations. Operators use scheduling software to automate Capacity cell operations: turning on cells before peak traffic and turning off after it ends. Trend analysis is popular and widely used to determine peak traffic periods and volumes in networks. Although trend analysis is a powerful technique widely used for a long time, it suffers from several drawbacks such as:

Traditionally operators automate operation of Capacity cells using scheduler programs and scripts to manage turn Trend Analysis requires at least 1-2 years of historical traffic data to accurately predict peaks and valleys. Green field network deployments do not have historical data therefore, it takes time before trends analysis can be utilized.

Peaks and valleys predicted from trend analysis are averages performed over a long time. Averages normalizes finer-grained changes providing a generalized result. To account for minor peak use changes as predicted in trend analysis, operators add extras time to start and end of peak hours. Longer use of Capacity cell means additional operational cost.

Long-term trend analysis cannot account for sudden changes in traffic patterns, for example, pandemic, natural disasters, economic impact caused by business failures etc. Manual intervention is necessary to reestablish the automation programing schedules.

Changes to network topology, (addition or consolidation of the cells) in a region impacts trend analysis results in predicting peak cell usage, is a severe limitation of this analysis.

Figure 2:
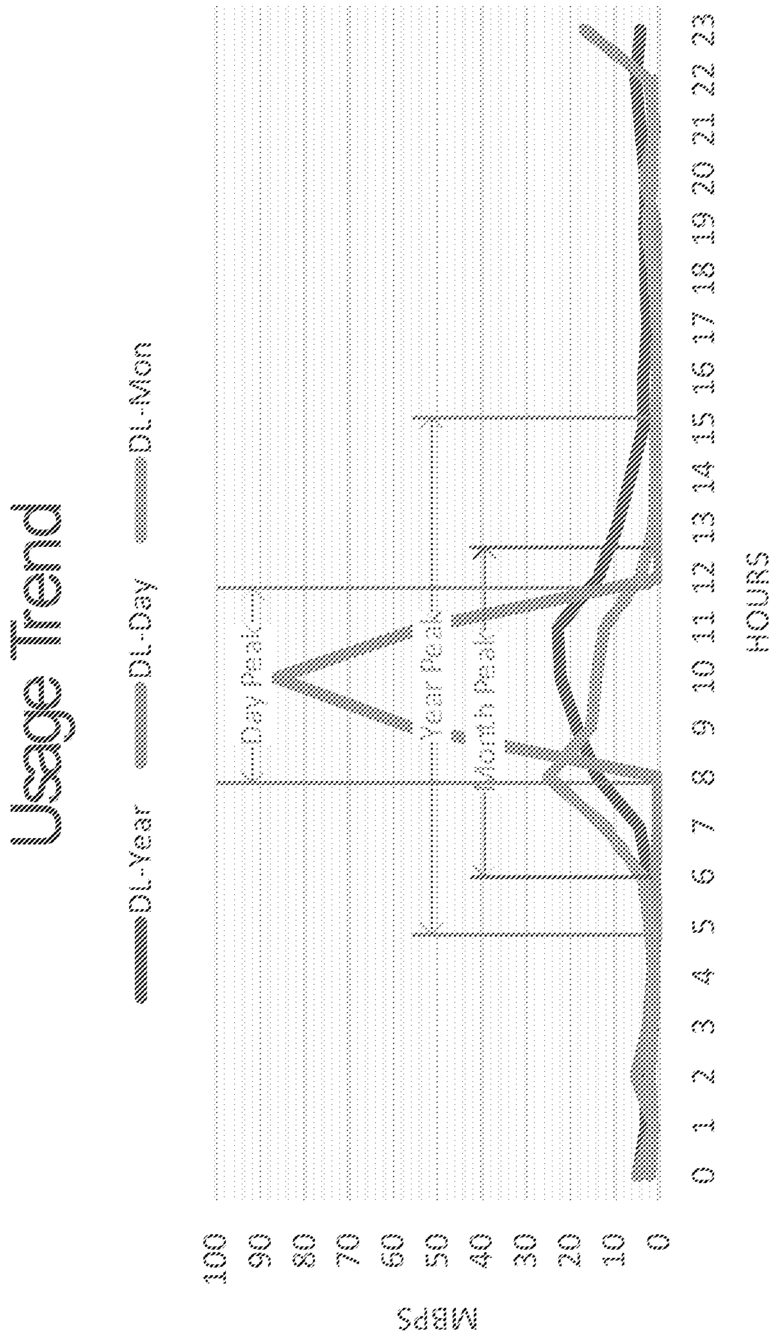
FIG. 2 is a schematic graph of a usage trend, in accordance with some embodiments.

FIG. 2 shows simple-trend analysis performed for a cell to predict peak hours. The data shows granularity predicting peak load. Yearly peak for the cell indicates most activities between hours 5-15 while, a recent month aggregation shows peak hours 6-13 which is narrower. A random day picked from the same month shows the peak hours even narrower from 8 to 12. An operator who uses this trend analysis to provision peak hour capacity for City Center example would choose monthly average 10 hours to operate the capacity cells while for a day the peak capacity is only 4 hours. For that day, the operator will be running capacity cells additional 6 hours when there is no load. A saving of 60% reduction in power Capacity cells on that day. Adding daily saving should reduce regional operating costs from Power alone anywhere from which is a direct savings.

Trend analysis-based traffic optimization technique described above is static, requires constant manual tuning to deal with cyclical traffic pattern changes. Operators using Trend-analysis techniques typically maintain higher capacity buffers to respond micro-level traffic demands to maintain quality of service. To meet dynamic traffic peaks operators over provision capacity, throughput and coverage in these areas adding higher operating cost to bottom line. It's clearly a disadvantage for 5G deployments because it requires higher cell density and consumes more power dramatically increasing buffer requirements and power increase.

Solution Approach

Machine Learning (ML) forecasting models are gaining popularity over trend analysis because of accuracy and ability to closely follow time-series changing trends. Retail supply-chains widely use ML forecasting models to predict demand in-advance to maintain product availability without inventory buildup. Similarly, Network Traffic optimization is a dynamic problem application of supply and demand concepts with close-loop control should minimize capacity buffer requirements.

Core concept in Dynamic Traffic Management continuous forecasting of network traffic over a region followed by a control plan closely adjusting Capacity cell operations to grow and shrink capacity matching with the forecast. Performing the demand forecasting and capacity adjustment in a close loop frequently, operators should follow demand curve minimizing capacity buffer. Dynamic Traffic Management system designed has two components: (1) a ML-based forecasting model predicting traffic volumes continuously at every base-station, and (2) a heuristic algorithm determining which Capacity cells should be enabled or disabled to meet capacity demands based on forecast. Accuracy of forecasting model plays a crucial role managing network throughput closely enabling higher QoS.

A Dynamic Traffic Management solution would be also beneficial for operators wanting to lower costs while upgrading to 4G/5G services or adding cell density in a network region because the ML prediction models are adaptable to forecast generalization without significantly dropping prediction accuracy minimizing the capacity buffer.

In this approach an automated system forecasts traffic builds up ahead of time which allows regional traffic control system to grow and shrink capacity just-in-time to match demand allowing a precise control of capacity & demand closely matched all times. As a result, the Operator reduces waste taking out operating capacity when demand is not present.

Control and Management Interfaces with DTC Application

DTC application supports multiple interfaces to receive admin/control parameters from operator, system interfaces to receive data from operator network, optionally integration with call control interface to control operation of cells, and system interfaces with the Training environment performing continuous training.

Objective Optimization:

Minimize (Capacity—Demand) Each Time Step

Figure 3:
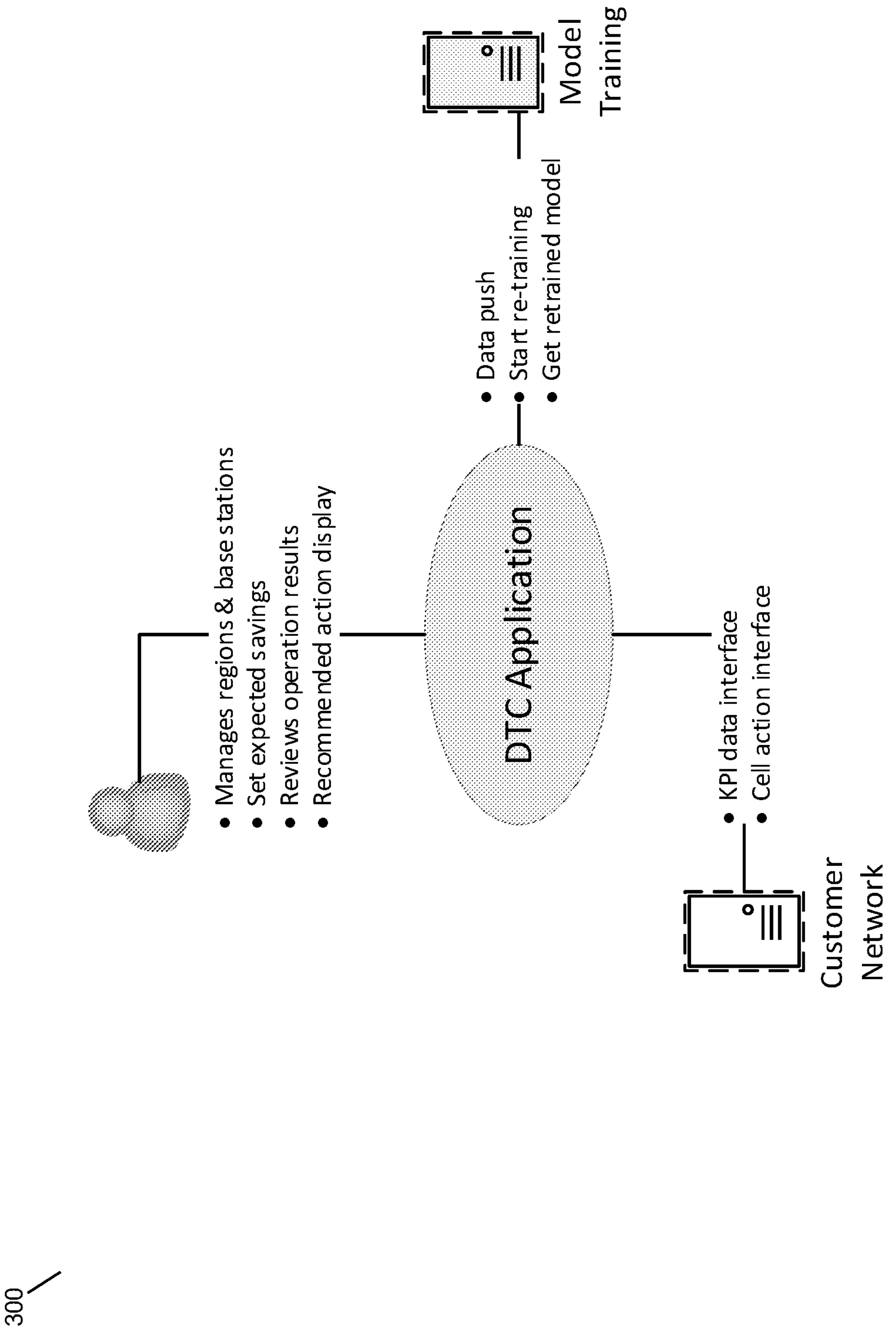
FIG. 3 is a schematic diagram of a dynamic traffic controller (DTC) application, in accordance with some embodiments.

FIG. 3 illustrates DTC application interface support with other systems. Model Training environment is a common PW platform that supports data collection and model retraining activities related to multiple features. Customer network represents integration with PW EMS or Non-RT-RIC to receive data. Users have web UI to configure, control DTC application.

Architecture

DTC architecture follows the design principles of ML applications with Continuous Training capability. The core application as shown in FIG. 3 receives KPI feeds from the network periodically to generate cell operation action space for capacity cells present in the network. The recommended actions can be applied manually or automatically to the regional network to optimize the capacity for the traffic demands. Model training environment has a lazy collector mechanism to accumulate training specific data from the application, store in the database in anticipation of the model training activity. As forecasting model loses prediction accuracies below recommended thresholds, model retraining activity begins generating a new model with higher accuracy. The new forecasting model is then deployed in DTC Application allowing the application to operate at highest degree of accuracy.

Figure 4:
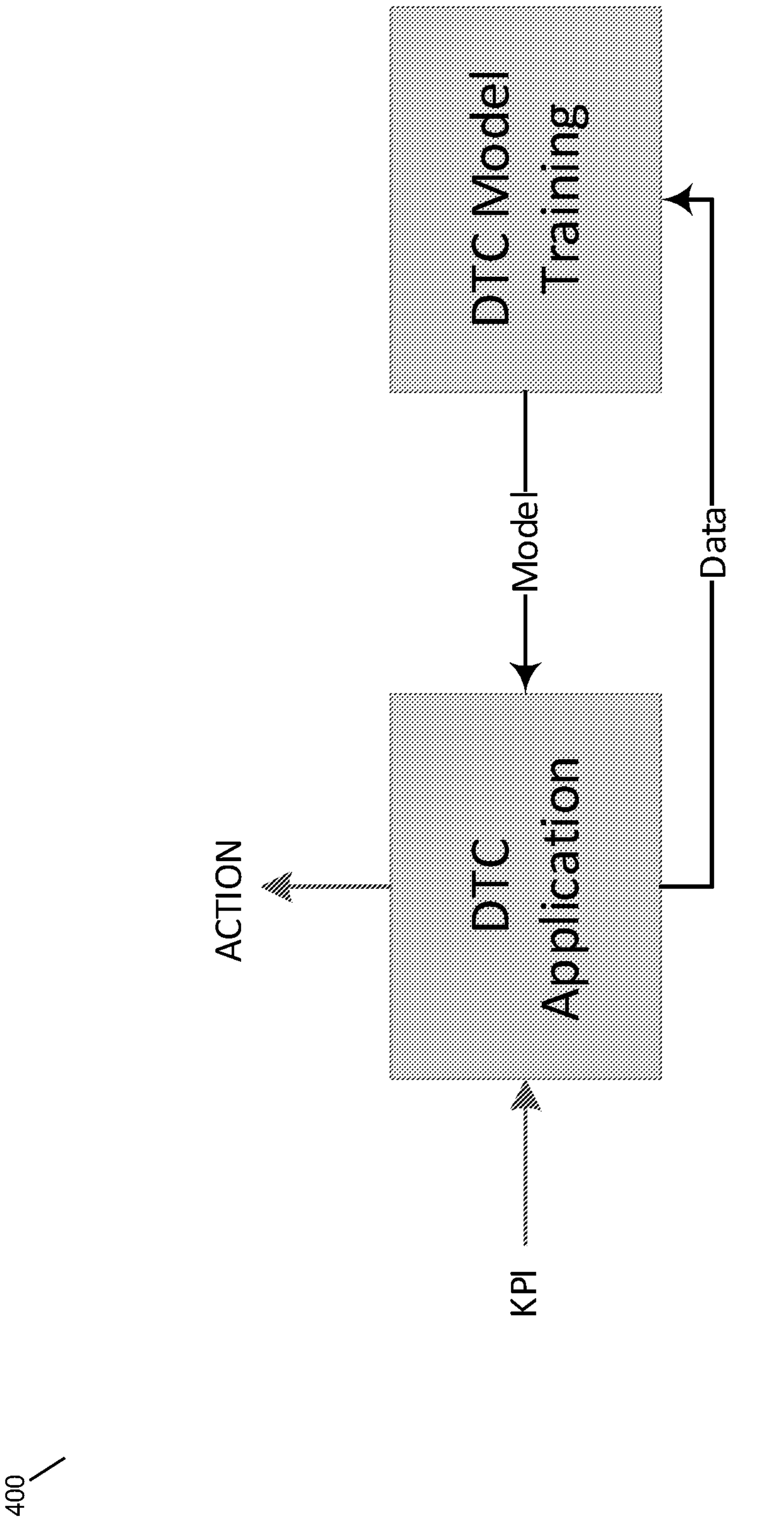
FIG. 4 is a schematic diagram of a DTC application being trained, in accordance with some embodiments.

FIG. 4 shows a DTC application has multiple logical components to recommend predictions from the KPI data and to operate within a customer environment with necessary level of controls, integrations, and target goals. Application includes integration points to periodically collect KPI data from customer's network for base stations in a customer configured regional network. The Regional Manager stores customer configured information, regions, cell types (coverage vs. capacity), actual and expected savings, any blackout periods for power actions etc. Configuration parameters entered in the application manually or automatically by the customer.

Model manager in DTC application tracks model health and model input data. Operating model thresholds are predetermined set by data scientists indicating when model training should be triggered. The KPI data fed into DTC application is cached, pushed to training environment in a lazy fashion. Controller predicted actions taken by the recommender made available to externally either manual or automated actions.

In some embodiments the DTC application and DTC model training may be located on the same physical device. In some embodiments, the DTC application may be embodied as a machine learning (ML) model, and the ML model may be deployed to the edge of the network, as shown by the arrow, in some embodiments to a near-RT MC. In some embodiments the DTC application may be trained at a non-RT RIC. In some embodiments the model may be trained once and deployed to multiple near-RT RICs. The near-RT MC may take input from various KPIs and may further cause actions to be taken. In some embodiments the operation of the DTC application may be an rApp. The rApp may communicate with a corresponding xApp at the non-RT MC. The corresponding xApp may communicate with a management operation in the core network.

Figure 5:
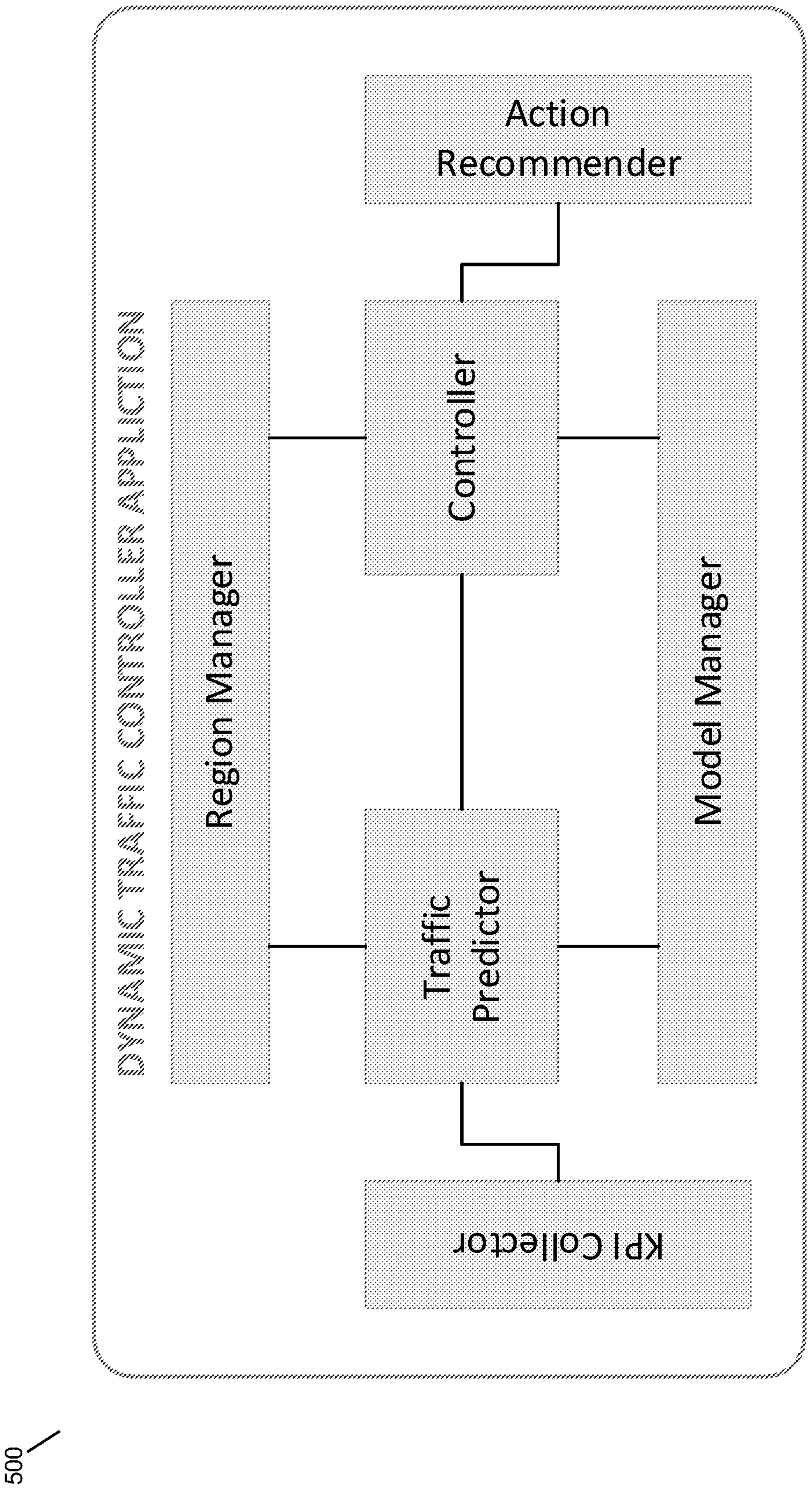
FIG. 5 is a detailed schematic diagram of a DTC application, in accordance with some embodiments.

FIG. 5 shows the DTC application bundled and packaged as a server-less docker container, deployed in any Kubernetes or other flavored environment either in public or private clouds. Depending on deployment, DTC application might include additional custom components to operate as RApp in Non-Real-Time-RIC or in PW EMS as needed by customer. The application bundle abstracts all services and libraries to run on multiple cloud environments (private or public). A region manager is in communication with a traffic predictor and controller. The traffic predictor and controller are in communication with a model manager. The traffic predictor is in communication with a KPI collector. The controller is in communication with an action recommender.

Benefits:

Dynamic traffic management and control solution closely matches demand adjusting capacity in increments.

Most Operators should expect shavings and higher QoS from network regions utilizing full automated model Modern networks build with as-as-Service model should benefit from the automation features offered by DTC As cell density grows with 5G DTC offers automated cost-effective solutions reducing rapid operational cost growth.

ORAN architecture RApp frameworks simplifies deployment of DTC application bundle and usability PW and other networks.

Figure 6:
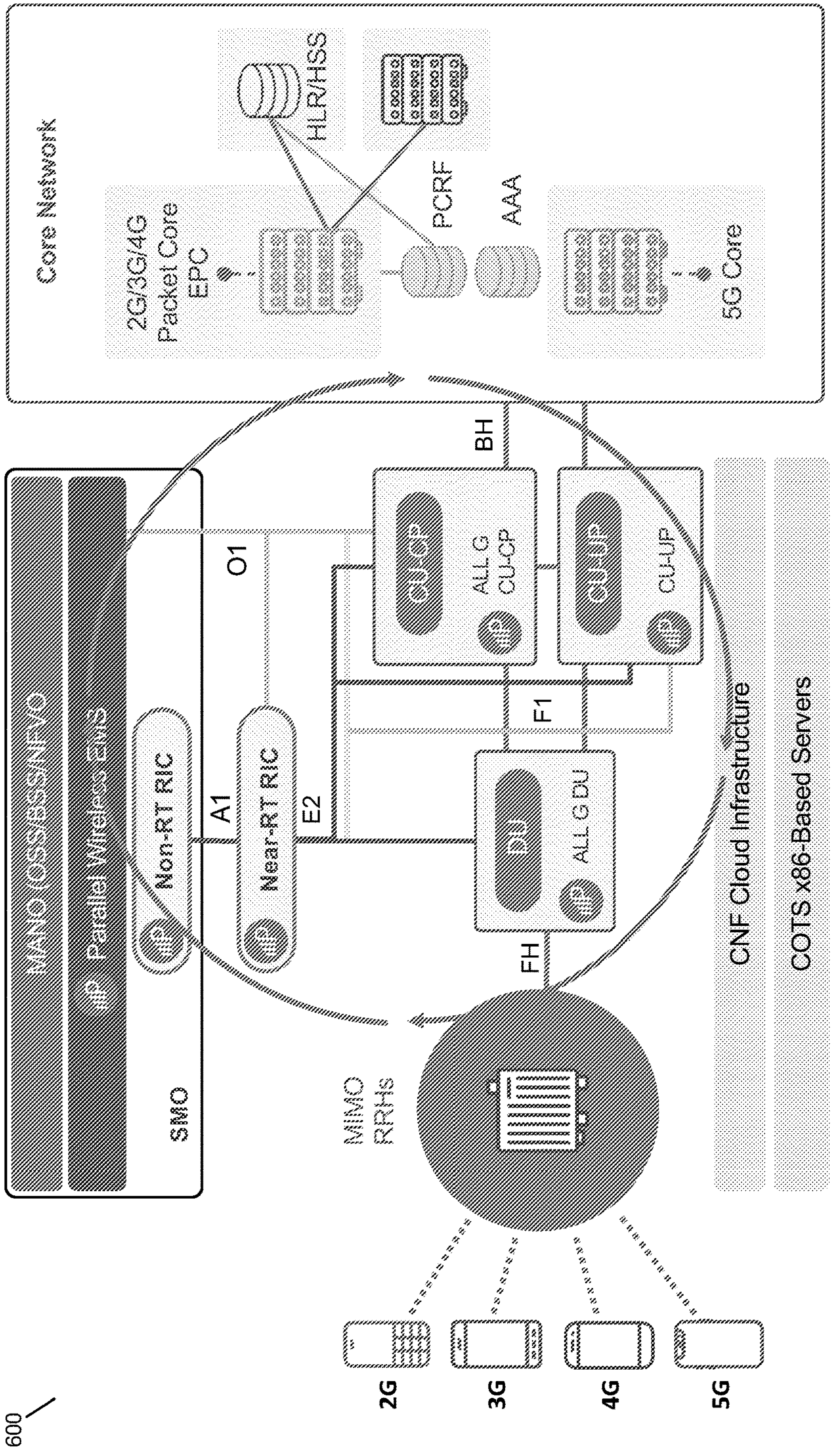
FIG. 6 is a schematic diagram of a multi-RAT RAN deployment architecture, in accordance with some embodiments.

FIG. 6 is a schematic diagram of a multi-RAT RAN deployment architecture, in accordance with some embodiments. Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT MC is capable of interoperating with not just 5G but also 2G/3G/4G.

The all-G near-RT RIC may perform processing and network adjustments that are appropriate given the RAT. For example, a 4G/5G near-RT RIC performs network adjustments that are intended to operate in the 100 ms latency window. However, for 2G or 3G, these windows may be extended. As well, the all-G near-RT RIC can perform configuration changes that takes into account different network conditions across multiple RATs. For example, if 4G is becoming crowded or if compute is becoming unavailable, admission control, load shedding, or UE RAT reselection may be performed to redirect 4G voice users to use 2G instead of 4G, thereby maintaining performance for users. As well, the non-RT RIC is also changed to be a near-RT RIC, such that the all-G non-RT RIC is capable of performing network adjustments and configuration changes for individual RATs or across RATs similar to the all-G near-RT RIC. In some embodiments, each RAT can be supported using processes, that may be deployed in threads, containers, virtual machines, etc., and that are dedicated to that specific RAT, and, multiple RATs may be supported by combining them on a single architecture or (physical or virtual) machine. In some embodiments, the interfaces between different RAT processes may be standardized such that different RATs can be coordinated with each other, which may involve interworking processes or which may involve supporting a subset of available commands for a RAT, in some embodiments.

Figure 7:
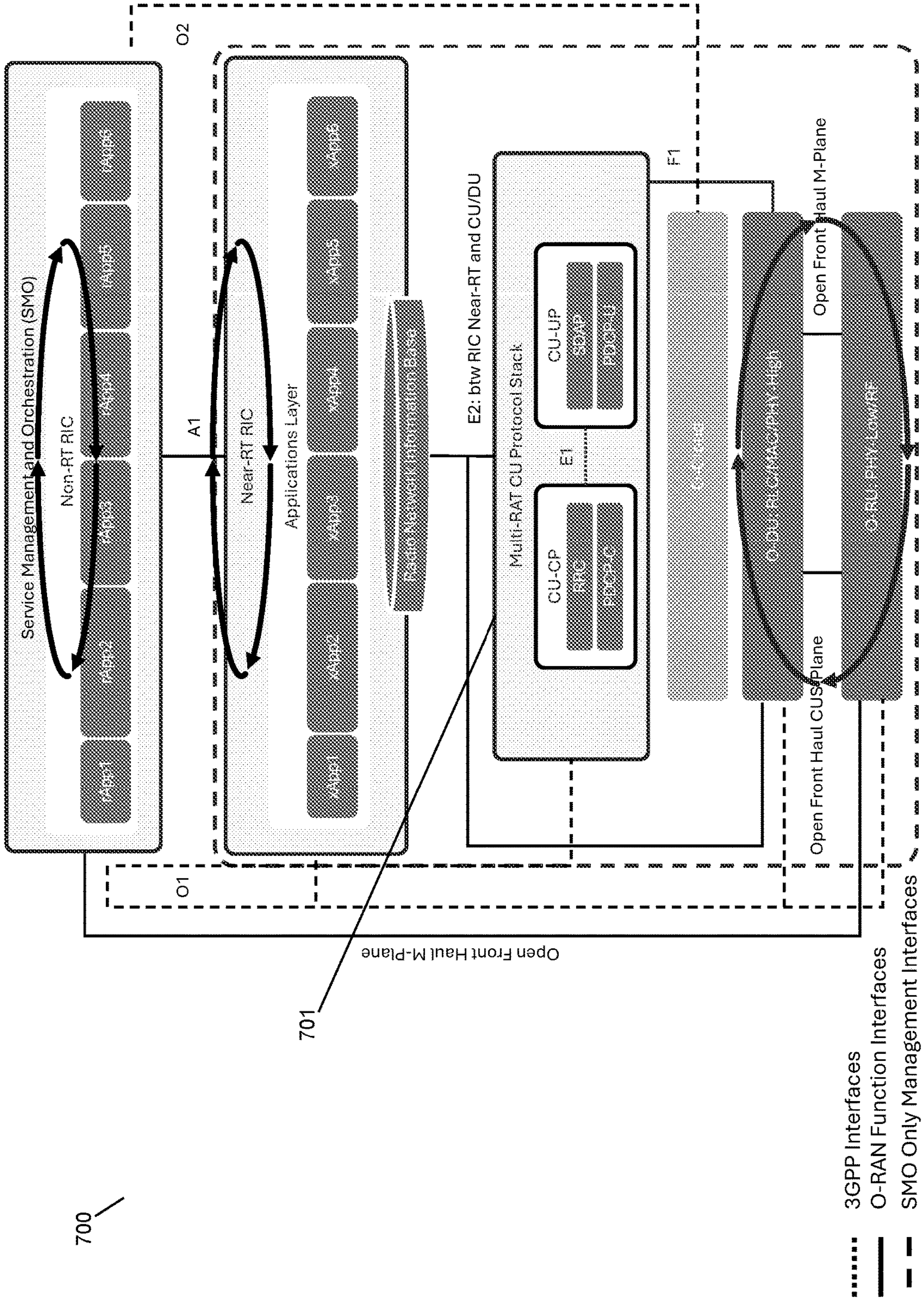
FIG. 7 is a further schematic diagram of a multi-RAT RAN deployment architecture, in accordance with some embodiments.

FIG. 7 is a further schematic diagram of a multi-RAT RAN deployment architecture, in accordance with some embodiments. The multi-RAT CU protocol stack 701 is configured as shown and enables a multi-RAT CU-CP and multi-RAT CU-UP, performing RRC, PDCP, and SDAP for all-G. As well, some portion of the base station (DU or CU) may be in the cloud or on COTS hardware (O-Cloud), as shown. Coordination with SMO and the all-G near-RT MC and the all-G non-RT RIC may be performed using the A1 and O2 function interfaces, as shown and elsewhere as specified by the ORAN and 3GPP interfaces for 4G/5G.

Figure 8:
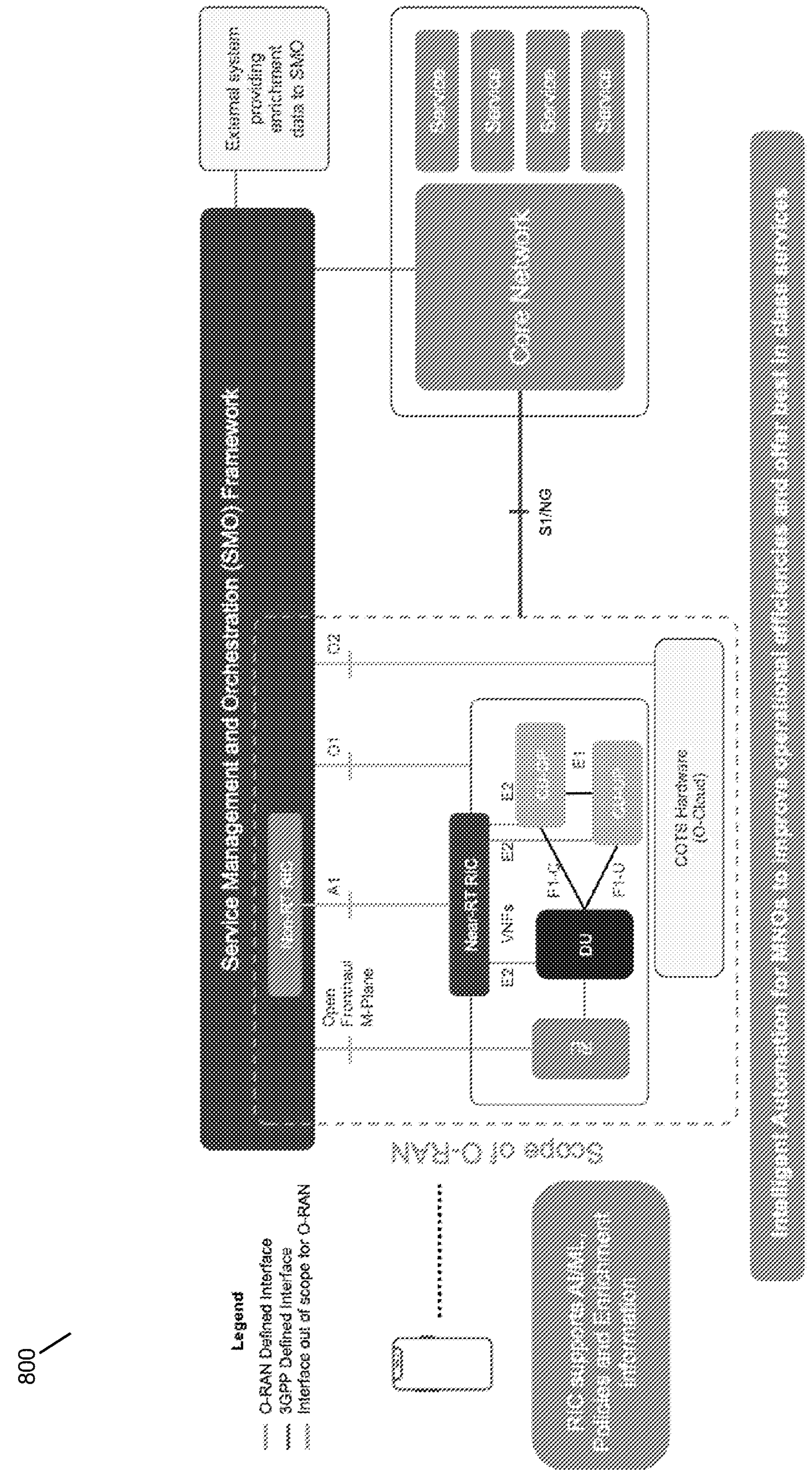
FIG. 8 is a further schematic diagram of a multi-RAT RAN deployment architecture, in accordance with some embodiments.

FIG. 8 is a further schematic diagram of a multi-RAT RAN deployment architecture, in accordance with some embodiments. This schematic diagram shows the use of the near/non-RT MC to provide AI/ML (artificial intelligence and machine learning) policies and enrichment across Gs. This may also involve an SMO framework that is outside of the RAN, that is interfaced through the non-RT RIC, and may also involve an external system providing enrichment data to the SMO, as well as the core network and any services thereon, in some embodiments. The all-G Non-RT RIC serves as the integration point for performing network optimizations and adjustments that take into account any offline processes for AI/ML that involve adjustments that operate outside of the UE latency window (for 4G/5G~100 ms), in some embodiments.

Figure 9:
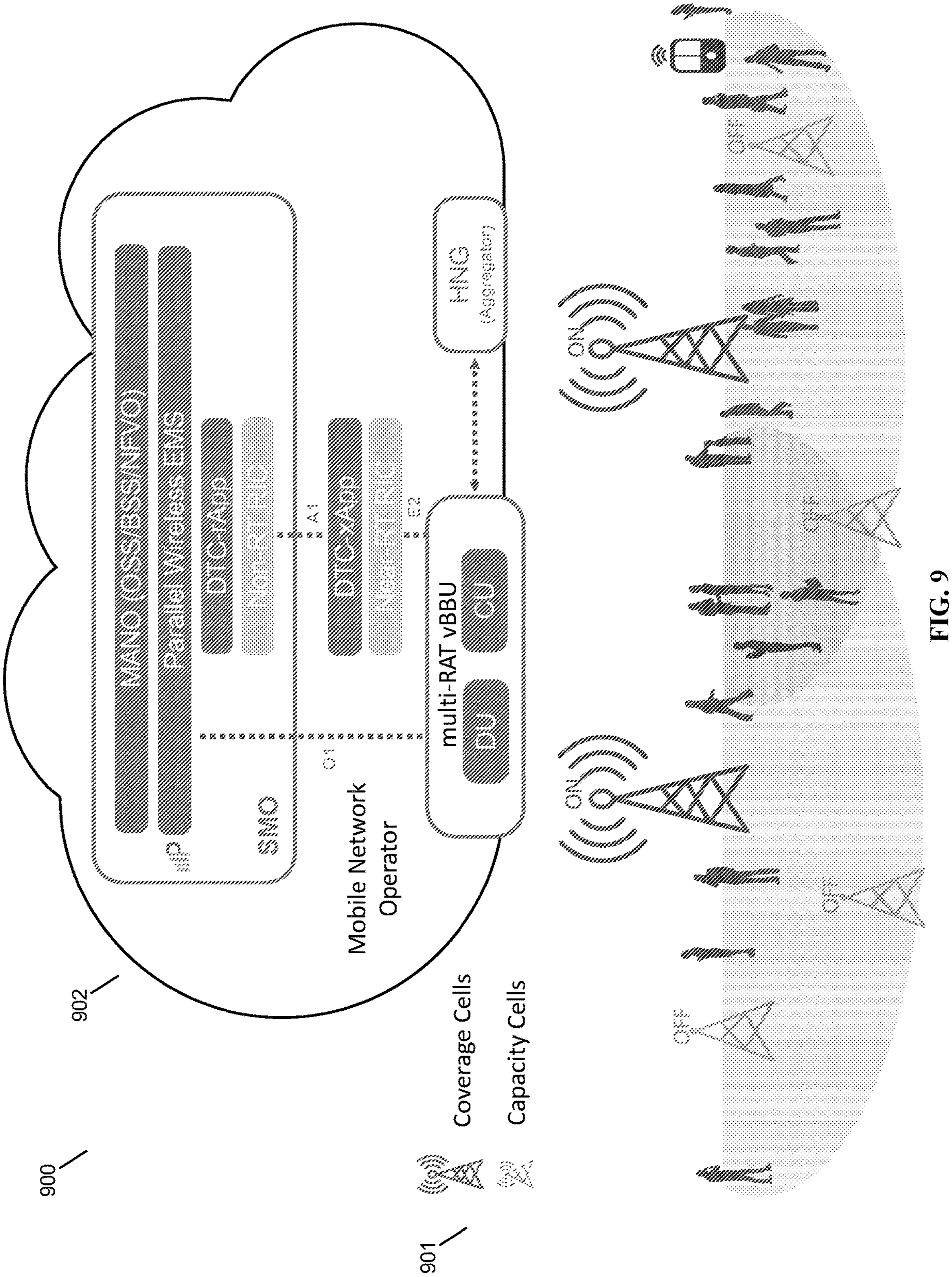
FIG. 9 is a schematic diagram of a multi-RAT RAN deployment in operation, in accordance with some embodiments.

FIG. 9 is a schematic diagram of a multi-RAT RAN deployment in operation, in accordance with some embodiments. Diagram 901 is a schematic diagram of users in proximity to a variety of cells, labeled coverage cells and capacity cells. Coverage cells provide users with a connection to the network that is durable, typically located at a high tower; this type of connection may not, however, enable high bandwidth given the large number of users supported at such cells. Capacity cells support a smaller number of users and use different radio technologies to enable high throughput to users. Capacity and coverage cells are enabled to trade off users as needed to maintain the needs of the network and the users as well. The diagram shows that while there are several capacity cells available in the network, they are all turned off.

Diagram 902 is a schematic diagram of the operator network, in accordance with some embodiments. A multi-RAT vBBU is in communication with a near-RT MC and a non-RT MC, as well as a Parallel Wireless element management system (EMS), which provides the system with awareness about active network nodes, as well as a MANO (OSS/BSS/NFVO) for network operational capabilities. The coverage and capacity cells shown in 901 are in communication with the all-G near-RT MC and all-G non-RT RIC. and aware of the network conditions through information available at the systems on which they are running.

In operation, for some embodiments, for example, when a coverage cell is heavily loaded, an rApp on the non-RT MC and an xApp on the near-RT MC coordinate to identify a mitigation, which can include identifying an appropriate capacity cell to activate; activating the cell; and handing over users from the coverage cell to the newly active cell. In another example, in some embodiments, in the case that admission control is identified as causing too many users to be admitted to the network at the same time, throttling may be performed. Monitoring of network load and a subsequent instruction to perform throttling may be initiated at the near-RT MC using an xApp, in some embodiments. This may be a multi-RAT activity and this may involve monitoring of network load for a first RAT and an instruction to perform throttling for a second RAT, in some embodiments.

Additional Embodiments

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods are described in reference to 3GPP, one of skill in the art would understand that these systems and methods could be adapted for use with other wireless standards or versions thereof.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 or ARM microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MIME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality. Where the term "all-G" is used herein, it is understood to mean multi-RAT (having at least two radio access technologies).

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method of providing dynamic traffic control for a network comprising:
- forecasting, using a model, network traffic build up over a region ahead of time; and
- adjusting network capacity by turning off or turning on a capacity cell of the network to match a forecasted demand from the model, allowing precise control of network capacity to meet network capacity demand while minimizing capacity buffering.

2. The method of claim 1 wherein the network traffic comprises a 4G, 5G or a multi-Radio Access Technology (RAT) network traffic.

3. The method of claim 1 wherein forecasting includes continuous forecasting.

4. The method of claim 1 further comprising generalizing the model for the network after services for the network have been upgraded or after cell density has been added to the network.

5. The method of claim 1 wherein adjusting network capacity includes reducing waste by taking out operating capacity when demand is not present.

6. The method of claim 1 further comprising receiving, by the model, administration or control parameters from a network operator.

7. The method of claim 1 further comprising receiving, by the model, operator network data.

8. The method of claim 1 further comprising:
- receiving, by the model, key performance indicator data from a customer; and
- controlling, by the model, operation of one or more cells of the network.

9. The method of claim 1 further comprising interfacing, by the model, with a model training environment to provide data, to start model retraining, and to receive a re-trained model.

10. A system for dynamic traffic control, comprising:
- a traffic predictor for a Radio Access Technology (RAT) network;
- a controller in communication with the traffic predictor;
- a Key Performance Indicator (KPI) collector in communication with the traffic predictor;
- a region manager in communication with the traffic predictor and the controller;
- a model manager in communication with the traffic predictor and the controller;
- an action recommender in communication with the controller; and
- wherein the system is configured to:
  - forecast network traffic buildup over a region ahead of time; and
  - recommend one or more network capacity adjustments by turning off or turning on a capacity cell of the network to match a forecasted demand from the system, allowing precise control of network capacity to meet network capacity demand while minimizing capacity buffering.

11. The system of claim 10 wherein the network traffic comprises 4G, 5G or a multi-Radio Access Technology (RAT) network traffic.

12. The system of claim 10 wherein forecast includes continuously forecast.

13. The system of claim 10 wherein the system is further configured to generalize the model for the network after services for the network have been upgraded or after cell density has been added to the network.

14. The system of claim 10 wherein adjust network capacity includes reduce waste by taking out operating capacity when demand is not present.

15. The system of claim 10 wherein:
- the KPI collector is configured to periodically receive KPI data for one or more base stations of a customer network;
- a model manager is configured to track health of and model input data for a machine learning forecasting model of the traffic predictor;
- the traffic predictor for the RAT network is configured to forecast network traffic buildup over the region ahead of time based on the KPI data using the machine learning forecasting model;
- the controller is configured to predict one or more network capacity adjustments by turning off or turning on a capacity cell of the network to match a forecasted demand from the system, allowing precise control of network capacity to meet network capacity demand while minimizing capacity buffering;
- a region manager is configured to store at least one of customer configured information, regions, cell types, savings or blackout periods for power actions; and an action recommender is configured to externally make the controller prediction available.

16. The system of claim 10 wherein the system is further configured to: receive operator network data; receive administration or control parameters from a network operator; receive key performance indicator data from a customer; and control operation of one or more cells of the network.

17. The system of claim 10 further comprising a model training environment coupled to the traffic predictor to provide data, start model retraining and receive a re-trained model.

18. A non-transitory computer-readable medium including instructions for providing dynamic traffic control for a network which, when executed, cause a system to perform steps comprising:

forecasting, using a model, network traffic build up over a region ahead of time; and adjusting network capacity to match a forecasted demand from the model, allowing precise control of network capacity to meet network capacity demand while minimizing capacity buffering.

19. The computer-readable medium of claim 18 further comprising instructions which, when executed, cause the system to further perform the step comprising generalizing the model for the network after services for the network have been upgraded or after cell density has been added to the network.

20. The computer-readable medium of claim 18 wherein adjusting network capacity includes reducing waste by taking out operating capacity when demand is not present.

* * * * *